United States Patent [19]

Ueda et al.

[11] 4,028,455
[45] June 7, 1977

[54] METHOD FOR PRODUCING A REDUCED-PRESSURE SHAPED MOULD

[75] Inventors: Shoji Ueda; Shuzi Ono; Hiroshi Sakaguchi; Hideo Tsunoda, all of Nagasaki, Japan

[73] Assignee: Mitsubishi Jukogyo Kabushiki Kaisha, Tokyo, Japan

[22] Filed: Oct. 17, 1975

[21] Appl. No.: 623,456

[30] Foreign Application Priority Data

Nov. 22, 1974 Japan ............................. 49-134691

[52] U.S. Cl. ...................................... 264/89; 164/7; 164/72; 164/160; 164/349; 264/92; 264/112; 264/128; 264/129; 264/220; 264/232; 425/388

[51] Int. Cl.² ...................... B22C 3/00; B29C 17/04

[58] Field of Search ............... 264/89, 90, 9 R, 93, 264/94, 101, 102, 112, 128, 129, 219, 220, 221, 340, 341, 232; 164/7, 72, 160, 349; 425/388

[56] References Cited

UNITED STATES PATENTS 3,955,266 5/1976 Honami et al. .................. 264/89 X Primary Examiner—Jan H. Silbaugh Attorney, Agent, or Firm—Cushman, Darby & Cushman

[57] ABSTRACT

A method for producing a reduced-pressure shaped mould comprises the steps of placing a pattern having gas-permeable orifices on a surface plate and adhering a coating film that is soluble in a solvent to the pattern by suction through the orifices. A flask having evacuating means is then placed on the surface plate on top of the film and the space portion defined by the film and the flask is filled with solid particles containing no caking agent which serves as a mould material. The mould material and flask are covered with an air-tight sheet and the evacuating means of the flask is actuated while that of the surface plate is released so that the sheet and coating film adhere to the upper and low surfaces respectively of the mould material by suction. The pattern and surface plate are then separated from the flask and a solution containing caking agent dissolved in the solvent is applied to the coating film which is adhered to the surface of a cavity formed at the lower surface of the mould material. The caking agent penetrates interstices between the solid particles whereby a layer that has been hardened by the caking agent may be formed in a surface layer portion bounding the cavity.

2 Claims, 7 Drawing Figures

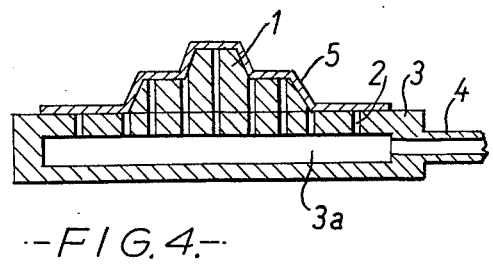
-FIG. 4.-
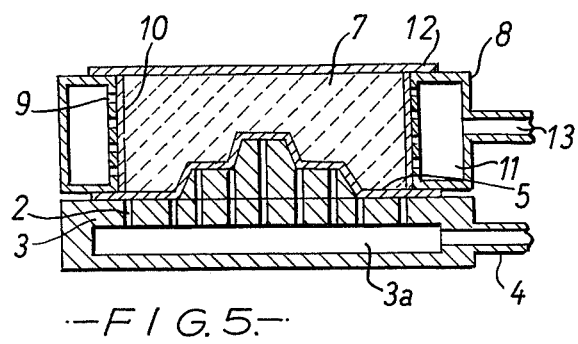
-FIG. 5.-
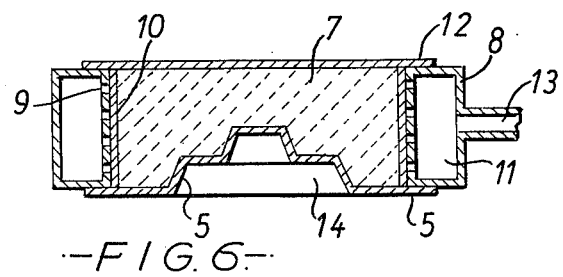
-FIG. 6.-
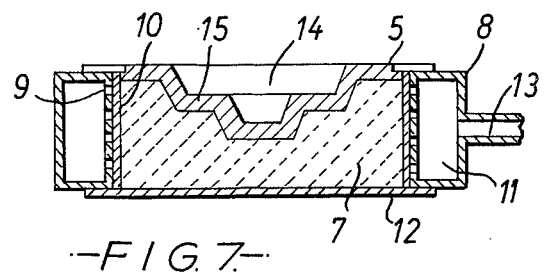
-FIG. 7.-

METHOD FOR PRODUCING A REDUCED-PRESSURE SHAPED MOULD

The present invention relates to a method for producing a reduced-pressure shaped mould.

Such a method which is known to us in Japan will now be described with reference to FIGS. 1 to 3 of the accompanying drawings in which.

Figure 1:
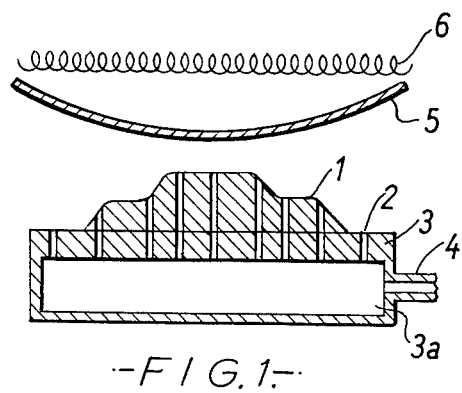
FIG. 1 is a cross-section of components used in the known method at one stage of the method.
Figure 2:
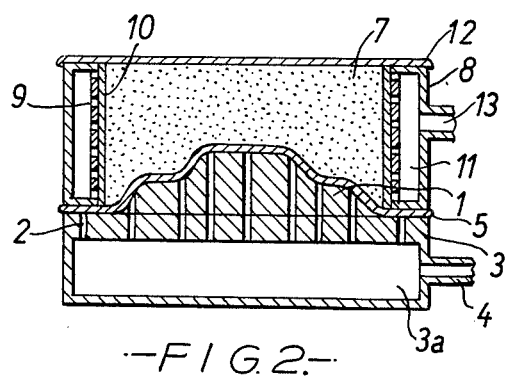
FIG. 2 is a cross-section of components used in the known method at a further stage.

With reference to FIG. 1 a pattern 1, having the shape of castings to be moulded, is fixedly placed on a surface plate 3 having a vacuum chamber 3a and an evacuating pipe 4. The pattern 1 is provided with a large number of gas-permeable orifices therein extending from its surface to the vacuum chamber 3a of the surface plate 3 through orifices 2 in the plate 3. Then the entire surface of the pattern 1 is covered with an air-tight sheet 5 made of a polyethylene vinyl acetate (EVA) copolymer film, after the sheet has been softened and brought into an easily expansible and contractible state by heating with any appropriate heating means 6. The air-tight sheet 5 is sucked in and adhered to the surface of the pattern 1 by reducing the pressure within the vacuum chamber 3 through the evacuating pipe 4. A flask 8 is subsequently fixedly placed on the sheet 5 as shown in FIG. 2. Along the outer peripheral wall portion of the flask 8 there is a vacuum chamber 11 provided with an evacuating pipe 13 and having a large number of gas-permeable orifices 9 communicating with the interior of the flask 8.

After the flask 8 has been fixedly placed as described above, its interior is filled with solid particles 7, not containing a caking agent, such as sand, iron granules or the like. An air-tight sheet 12 is then placed on the flask to cover the entire surface of the solid particles 7 including the upper edge surface of the flask 8 to seal the flask 8, and thereafter the interior of the vacuum chamber 11 is reduced in pressure through the evacuating pipe 13. During this operation the interstices between the solid particles 7 are reduced in pressure via the gas-permeable orifices 9, so that the air-tight sheets 5 and 12 are sucked onto the solid particles 7 in the flask 8.

Figure 3:
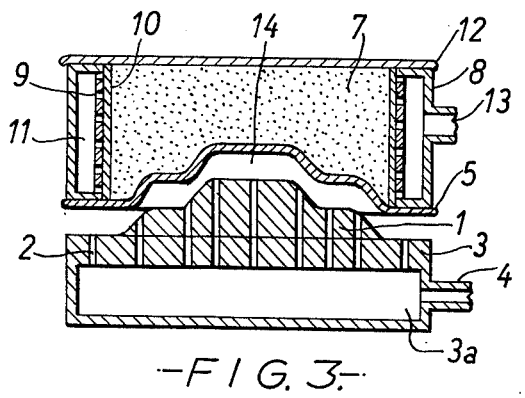
FIG. 3 is a cross-section of components in the final stage of manufacture in the known method.

When the pressure within the vacuum chamber 3a is restored to an atmospheric pressure, the air-tight sheet 5 is separated from the side of the pattern 1 and is attached by suction to the side of the solid particles 7. Subsequently, if the pattern 1 is separated from the flask 8 as shown in FIG. 3, a cavity portion (mould) 14 defined by the air-tight sheet 5 can be formed. Thus, if the flask 8 is turned upside-down and molten metal is poured into the cavity portion 14 and solidified, then a desired casting can be obtained. In FIGS. 2 and 3, reference numeral 10 designates a screen mounted on the inside wall surface of the flask 8, which screen 10 is provided for the purpose of preventing the solid particles 7 within the flask 8 from entering the vacuum chamber 11 via the gas-permeable orifices 9.

The method of producing a mould according to the above-described reduced-pressure shaping method in the prior art had the following disadvantages:

1. Since the melting point of an EVA plastic coating film is as low as about 100° C, in case of moulding a large-sized casting there is a fear that the coating film may possibly melt or burn as a result of a defect caused by mould deformation.

2. After the pattern has been separated from the mould, if the evacuation of the interior of the mould should be interrupted, mould deformation would occur, and therefore, the evacuation must be continued, even after separation of a mould, until the next pouring. Thus there is an inconvenience that even upon moving a mould an evacuating hose must be always kept connected.

The object of the present invention is to obviate or at least mitigate the aforementioned disadvantages of the known method.

For a better understanding of the present invention, and to show how it may be carried into effect, reference will now be made, by way of example to FIGS. 4 to 7 of the accompanying drawings, in which:

FIG. 4 is a cross-section of components used in a method according to the invention at one stage in the method;

FIG. 5 is a cross-section of components in the same method at a later stage;

FIG. 6 is a cross-section of a partially completed mould according to the invention; and FIG. 7 is a cross-section of a mould made by the method of FIGS. 4 to 6.

In FIGS. 4 to 7 and FIGS. 1 to 3 the same numerals have been used for the same component parts and the parts perform the same function in each case unless otherwise stated.

In its early stages the method using the components of FIGS. 4 to 7 differs from the prior art method in that the sheet 5 used in the present method is a coating film that is soluble in a solvent. It is to be noted that as a coating film that is soluble in a solvent, a polyvinyl alcohol (PVA) film that is soluble in water, a water-soluble paper containing as a principal component carboxymethyl-cellulose, and a plastic film that is soluble in general organic solvents are known, and these films are available as said coating film.

Now one method according to the present invention will be described as a sequence of steps.

At first, as shown in FIG. 4, the pattern 1 is placed on the surface plate 3 so that their gas-permeable orifices 2 may communicate with each other, and thereafter the coating film 5 that is soluble in a solvent and that has been placed on the surface of the pattern 1 after being heated (as described with reference to FIG. 1), is sucked onto the surface of the pattern 1 and the surface plate 3 by evacuation through the gas-permeable orifices 2 and the evacuating pipe 4. In the illustrated embodiment, a nylon film that is soluble in alcohol is used as a coating film.

Subsequently, as shown in FIG. 5, after the flask 8 has been placed on the surface plate 3, solid particles 7 not containing a caking agent, such as pebbles, nonferrous metal granules, iron granules or moulding sand, are placed in the interior of the flask 8 to fill it, and the upper surface of the solid particles and the flask is covered with an air-tight sheet 12 (vinyl sheet). Next, if the vacuum chamber 11 of the flask 8 is evacuated by means of an evacuating device (not shown) through the evacuating pipe 13 and simultaneously if the reduced pressure on the side of the surface plate 3 is released, then the air-tight sheet 12 is sucked onto the upper surface of the coagulated and hardened moulding sand 7 and the coating film 5 is sucked onto its lower surface.

Next, if the pattern 1 and the surface plate 3 are separated from the flask 8 as shown in FIG. 6, then a mould cavity portion 14 that is the same shape as the pattern 1 and is defined by the coating film 5, which is soluble in a solvent, as its surface, can be formed at the lower surface of the coagulated and hardened moulding sand 7. After the flask 8 has been turned upside-down, a solution containing a caking agent dissolved in a solvent which can dissolve the coating film 5 on the surface of the cavity portion 14, is applied to this surface (FIG. 7). In this way, in the upper layer of the moulding sand 7 a hardened layer 15 is formed, and thereby a desired mould can be obtained. In the present embodiment, the principal component and the composition of the applied solution are as follows:

| | |
|---|---|
| ethylsilicate 40 | 40 parts |
| ethylalcohol | 15 parts |
| 5% conc hydrochloric acid aqueous solution | 10 parts |
| 50% vinyl acetate methanol solution | 40 parts |
| | (proportions in weight) |

The principal solvent in this composition is alcohol, and the caking agent that is soluble in the solvent is vinyl acetate and ethylsilicate. It is to be noted that as a resin that is soluble in alcohol, phenol resin, nylon resin or the like has been known, and it is of course possible to apply these resins to the alcohol soluble coating film.

It is to be noted that if a water-soluble coating film is used as the coating film 5, then a solution containing a water-soluble caking agent could be applied to the surface of the coating film 5, while if a coating film that is soluble in another organic solvent is used, then a soluble containing a caking agent that is soluble in said organic solvent could be applied to the surface of the coating film 5.

When a solution that can solve the coating film 5 has been applied to the surface of the coating film 5, the coating film 5 is dissolved in the solvent contained in the solution, and since the interstices in the moulding sand 7 are reduced in pressure, the caking agent contained in the dissolved coating film 5 and in the solution can permeate into the interstices of the moulding sand 7.

Thereupon, the solvent in the solution is evaporated and removed from the moulding sand 7 through the evacuating pipe 13, so that the coating film material as well as the caking agent permeated through the surface layer of the moulding sand 7 will be hardened, resulting in a hardened layer of sand having a large mechanical strength in the surface layer portion of the moulding sand 7. The mechanical strength of these hardened layers is different depending upon the kind of the caking agent, and for instance, in the case of the above-referred ethylsilicate-vinylacetate system, the compression strength is as high as 40 to 60 kg/cm$^2$. The application of a solution containing a caking agent is carried out so that a hardened layer 15 of 2 mm to 10 mm in thickness may be formed in the surface layer portion of the cavity section.

FIG. 7 shows a cross-section of a mould which has been formed with a hardened layer 15 of about 2 to 10 mm in thickness having a large mechanical strength along the surface of the cavity section 14 through the above-described method. Although there is no need to apply a mould paint upon pouring a molten metal because the hardened layer itself is a layer having an excellent refractory nature, for confirmation a mould paint could be further applied.

A method in accordance with the present invention having the features described with reference to FIGS. 4 to 7 results in the following advantages:

1. Since a solution containing a caking agent dissolved in a solvent permeates through moulding sand by applying the solution containing the caking agent solved in the solvent onto a coating film that is soluble in the solvent and that has been sucked onto the surface of the moulding sand, a rigid hardened layer of 2 mm or more in thickness can be formed in the surface layer portion of the mould cavity. Because this hardened layer has a very high mechanical strength, the shape of the mould would not be deformed even if the evacuation in the interior of the mould should be interrupted. Accordingly, where it takes a long time from the production of the mould to the pouring, or when the mould has to be moved, continued evacuation through the pipe 13 becomes unnecessary, so that the workability can be extremely enchanced.

2. The formed hardened layer is excellent not only in mechanical strength but also in refractoriness. Therefore, not only sand burning upon pouring can be prevented, but also defects of sand mixing caused by mould deformation during the pouring which have been found in the reduced-pressure shaping method in the prior art can be obviated.

As a result, with a mould produced through a method described, moulding of large-sized castings which was impossible through the reduced-pressure shaping method in the prior art becomes possible, and also the evacuation which has been heretofore carried out after the production of the mould until the pouring can be eliminated, so that the workability can be extremely improved.

We claim:

1. A method for producing a reduced-pressure shaped mould comprising the steps of placing a pattern having gas-permeable orifices on a surface plate provided with first evacuating means, applying a coating film that is soluble in a solvent to the surface of said pattern and fixing it thereto by means of said first evacuating means, placing on the surface plate a flask provided with second evacuating means, filling the space portion defined by the coating film and the flask with solid particles, containing no caking agent, which serves as mould material, covering the surface of said mould material with an air-tight sheet, releasing the reduced pressure within the surface plate while evacuating the interior of said flask with the second evacuating means to make the air-tight sheet and the coating film adhere to the upper and lower surfaces, respectively, of the mould material, separating the pattern and the surface plate from the flask, and thereafter applying a solution, containing caking agent dissolved in the said solvent, to the coating film, which is adhered to the surface of a cavity formed at the lower surface of the mould material to enable the said caking agent to dissolve said coating film and penetrate interstices between the solid particles, and evaporating and removing said solvent whereby a layer that has been hardened by the said caking agent and coating film material is formed in a surface layer portion of the mould material bounding the cavity.

2. A mould shaped by the method according to claim 1.

* * * * *